(12) United States Patent
Yasuda et al.

(10) Patent No.: US 9,052,479 B2
(45) Date of Patent: Jun. 9, 2015

(54) OPTICAL BOARD, METHOD FOR MANUFACTURING THE SAME, AND OPTICAL MODULE

(71) Applicant: Hitachi Metals, Ltd., Tokyo (JP)

(72) Inventors: Hiroki Yasuda, Mito (JP); Hiroshi Ishikawa, Hitachi (JP); Kouki Hirano, Hitachinaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/054,629

(22) Filed: Oct. 15, 2013

(65) Prior Publication Data

US 2014/0133799 A1 May 15, 2014

(30) Foreign Application Priority Data

Nov. 9, 2012 (JP) ................................. 2012-247199

(51) Int. Cl.
G02B 6/12 (2006.01)
G02B 6/42 (2006.01)

(52) U.S. Cl.
CPC ............. *G02B 6/4214* (2013.01); *Y10T 29/49* (2015.01)

(58) Field of Classification Search
USPC ................................... 385/88–92, 14; 29/592
See application file for complete search history.

(56) References Cited

U.S. PATENT DOCUMENTS

| 5,671,315 | A   | * | 9/1997  | Tabuchi et al. ............... 385/137 |
| 5,783,368 | A   | * | 7/1998  | Richter et al. ............... 430/315 |
| 6,327,407 | B1  | * | 12/2001 | Mitsuda et al. ............... 385/49 |
| 6,947,645 | B2  |   | 9/2005  | Korenaga et al. |
| 7,052,189 | B2  | * | 5/2006  | Naka et al. ....................... 385/92 |
| 8,548,284 | B2  | * | 10/2013 | Warashina et al. ............. 385/14 |
| 2003/0118288 | A1 |   | 6/2003  | Korenaga et al. |
| 2011/0026875 | A1 | * | 2/2011  | Bowen ............................ 385/14 |

FOREIGN PATENT DOCUMENTS

JP 2003-167175 A 6/2003

* cited by examiner

*Primary Examiner* — Ellen Kim
(74) *Attorney, Agent, or Firm* — McGinn IP Law Group, PLLC (57) ABSTRACT

An optical board a substrate includes a plate-shaped resin including a first main plane and a second main plane, and an optical fiber receiving portion to receive an optical fiber, a first metal layer provided on the first main plane, and a second metal layer provided on the second main plane. The optical fiber receiving portion has a cavity structure, which penetrates in a thickness direction of the substrate between the first main plane and the second main plane, and the optical fiber is prevented from slipping out of the first main plane and the second main plane.

19 Claims, 10 Drawing Sheets

OPTICAL BOARD, METHOD FOR MANUFACTURING THE SAME, AND OPTICAL MODULE

The present application is based on Japanese patent application No. 2012-247199 filed on Nov. 9, 2012, the entire contents of which are incorporated herein by reference.

BACKGROUND OF THE INVENTION

1. Field of the Invention

This invention relates to an optical board to receive an optical fiber, a method for manufacturing an optical board, and an optical module with an optical board.

2. Description of the Related Art

Conventionally, an optical mounting board which has a groove for holding an optical fiber and on which a photoelectric conversion device is mounted has been known as disclosed by Japanese Patent Laid-Open No. 2003-167175 (JP-A-2003-167175).

The optical mounting board disclosed by JP-A-2003-167175 is formed with a guide groove for receiving an optical fiber by pressing a die having a triangular pole-shaped protrusion on a substrate material softened by high temperature heating. This guide groove is shallower in depth than the thickness of the substrate material. The optical fiber is fixed by being pressed into the guide groove by a flat glass which is fixed to the surface of the optical mounting substrate.

SUMMARY OF THE INVENTION

Meanwhile, with increasing density of components in electronic devices such as information processing devices, communication devices, etc. in recent years, the optical mounting board is also required to be reduced in thickness. Such a reduction in thickness is increasingly required. For example, the optical board is required to be thinned to a thickness of the same order as the diameter of the optical fiber.

With the method for manufacturing an optical mounting board disclosed by JP-A-2003-167175, the depth of the guide groove cannot be on the same order as the thickness of the board material. Also, the thickness of the optical mounting board becomes thicker by the thickness of the flat glass.

Accordingly, it is an object of the present invention to provide an optical board, a method for manufacturing an optical board, and an optical module, which can be reduced in thickness.

(1) According to a feature of the invention, an optical board comprises:

a substrate comprising a plate-shaped resin including a first main plane and a second main plane, and an optical fiber receiving portion to receive an optical fiber;

a first metal layer provided on the first main plane; and a second metal layer provided on the second main plane, wherein the optical fiber receiving portion comprises a cavity structure, which penetrates in a thickness direction of the substrate between the first main plane and the second main plane, and wherein the optical fiber is prevented from slipping out of the first main plane and the second main plane.

In the first embodiment, the following modifications and changes can be made.

(i) The optical fiber receiving portion is at least partially covered with the second metal layer on a side of the second main plane.

(ii) The optical fiber receiving portion is covered with an insulating film which covers the first metal layer on a side of the first main plane.

(iii) The optical fiber receiving portion is covered with the first metal layer on a side of the first main plane, and the first metal layer comprises a plurality of apertures communicating a receiving space of the optical fiber receiving portion.

(iv) The optical fiber receiving portion is covered with the second metal layer on a side of the second main plane, and the second metal layer comprises a plurality of apertures communicating a receiving space of the optical fiber receiving portion.

(v) The optical board further comprises a third metal layer provided on a surface of the substrate in the optical fiber receiving portion.

(vi) The optical fiber is fixed to the optical fiber receiving portion by a solder.

(vii) The optical board further comprises a reflecting surface provided in the substrate at an end of the optical fiber receiving portion to reflect light propagating through the optical fiber, the reflecting surface being inclined relative to the first main plane.

(2) According to another feature of the invention, a method for manufacturing the above optical board comprises:

irradiating laser light from the side of the first metal layer and the side of the second metal layer to pass the laser light through the apertures in the first metal layer and the second metal layer and thereby form the optical fiber receiving portion in the substrate.

(3) According to a still another feature of the invention, an optical module comprises:

the optical board according to (1), and a photoelectric conversion device for converting an optical signal through the optical fiber as a transmission medium to an electrical signal or for converting an electrical signal to an optical signal through the optical fiber as the transmission medium.

(Points of the Invention)

According to the present invention, it is possible to provide an optical board, a method for manufacturing an optical board, and an optical module which can be reduced in thickness.

BRIEF DESCRIPTION OF THE DRAWINGS

The preferred embodiments according to the invention will be explained below referring to the drawings, wherein:

FIGS. 1A and 1B show an example of a configuration of an optical board and an optical module with that optical board in the first embodiment according to the invention, wherein FIG. 1A is a plan view thereof and FIG. 1B is a side view thereof;

FIGS. 9A and 9B show one example of the optical module in which the optical fiber is fixed with solder in the second embodiment, wherein FIG. 9A is a cross sectional view taken along A-A line of FIG. 5 and FIG. 9B is a partially enlarged view of FIG. 5.

DETAILED DESCRIPTION OF THE PREFERRED EMBODIMENTS

First Embodiment

Figure 1A:
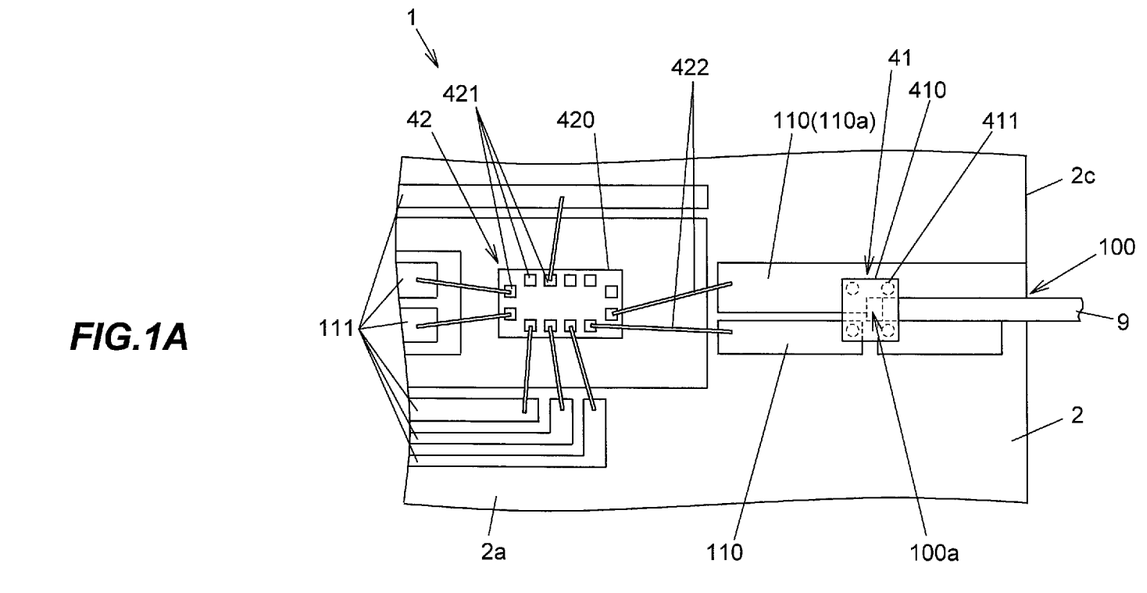
Figure 1B:
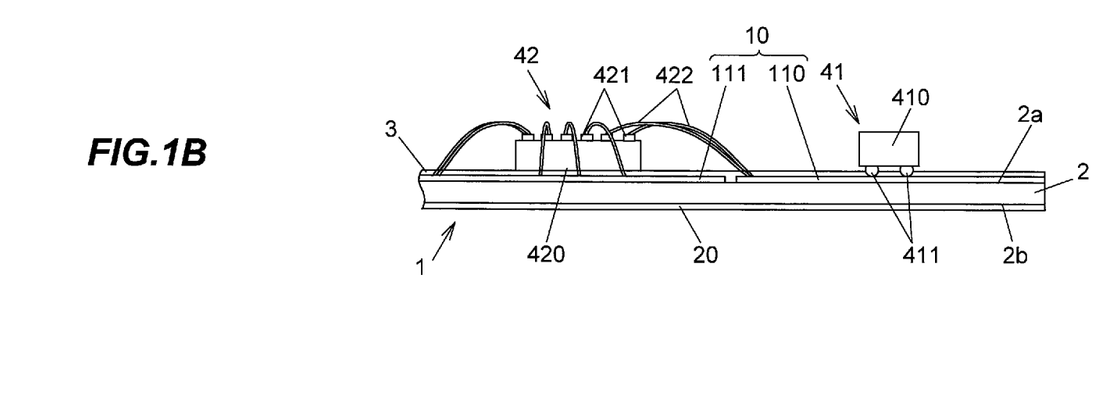

FIGS. 1A and 1B show an example of a configuration of an optical board and an optical module with that optical board in the first embodiment according to the invention, in which FIG. 1A is a plan view thereof and FIG. 1B is a side view thereof.

The optical board 1 includes a plate-shaped substrate 2 having a first main plane 2a and a second main plane 2b which are facing each other. The substrate 2 is made of, e.g., an insulating resin such as polyimide. The first main plane 2a and the second main plane 2b are parallel to each other, and the thickness of the substrate 2 is, e.g., 70 µm. FIG. 1A shows a state of the optical board 1 viewed from the side of the first main plane 2a.

Further, the optical board 1 further includes a first metal layer 10 provided on the first main plane 2a of the substrate 2, and a second metal layer 20 provided on the second main plane 2b of the substrate 2. In the present embodiment, the second metal layer 20 is provided entirely over the entire second main plane 2b. The first metal layer 10 includes a photoelectric conversion device wiring pattern 110 to be electrically connected to a photoelectric conversion device 41 (to be described later), and a semiconductor circuit element wiring pattern 111 to be electrically connected to the semiconductor circuit element 42 (to be described later).

Further, the substrate 2 is provided with a slit-shaped optical fiber receiving portion 100 which penetrates in the thickness direction of the substrate 2 between the first main plane 2a and the second main plane 2b, and which extends parallel to the first main plane 2a and the second main plane 2b. At one end portion of the optical fiber receiving portion 100, a reflecting surface 100a for reflecting a light through an optical fiber 9 as a transmission medium is formed. The other end portion of the optical fiber receiving portion 100 is opened toward an end face 2c (a side surface at the end portion of the substrate 2 between the first main plane 2a and the second main plane 2b) of the substrate 2, so that the optical fiber 9 is inserted from that aperture into the optical fiber receiving portion 100.

The optical fiber receiving portion 100 has a cavity structure in which the optical fiber 9 received (accommodated) is prevented from slipping out of the first main plane 2a and the second main plane 2b. Further, the optical fiber receiving portion 100 is covered with a resist 3 as an insulating film formed on the side of the first main plane 2a, and the resist 3 is formed to cover the first metal layer 10 and the optical fiber 9 is held to be prevented from slipping out of the first main plane 2a.

On the first main plane 2a of the optical board 1, the photoelectric conversion device 41 is mounted on the photoelectric conversion device wiring pattern 110, and the semiconductor circuit element 42 is mounted on the semiconductor circuit element wiring pattern 111. The photoelectric conversion device 41 is a device which converts an electrical signal into an optical signal, or that converts the optical signal to an electrical signal. As examples of the former one, light-emitting elements such as LED (Light Emitting Diode), semiconductor laser element may be cited. Further, as examples of the latter one, light-receiving elements such as photodiode may be cited. The photoelectric conversion device 41 is configured to output or input a light along a direction perpendicular to the substrate 2 from a light receiving or emitting portion 412 which is provided on the side of the substrate 2 (see FIG. 2).

When the photoelectric conversion device 41 is a device which converts an electrical signal into an optical signal, the semiconductor circuit element 42 is a driver IC for driving the photoelectric conversion device 41. Alternatively, when the photoelectric conversion device 41 is a device which converts an optical signal to an electrical signal, the semiconductor circuit element 42 is a receiver IC for amplifying a signal inputted from the photoelectric conversion device 41.

In the present embodiment, the photoelectric conversion device 41 is flip-chip mounted, and four terminals (bumps) 411 are provided in a main body portion 410. The four terminals 411 are electrically connected to the photoelectric conversion device wiring pattern 110, respectively. Further, the photoelectric conversion device 41 is mounted such that the main body portion 410 is located to face the reflecting surface 100a.

When the photoelectric conversion device 41 is a device for converting an electrical signal into an optical signal, the reflective surface 100a reflects the light emitted from the photoelectric conversion device 41 toward the end face of the optical fiber 9. Further, when the photoelectric conversion device 41 is a device for converting an optical signal to an electrical signal, the reflection surface 100a reflects the light emitted from the optical fiber 9 toward the photoelectric conversion device 41.

The semiconductor circuit element 42 is provided with a plurality (twelve in the example shown in FIG. 1) of terminals (electrode pads) 421 on the opposite side of the main body portion 420 to the surface facing the semiconductor circuit element wiring pattern 111. The terminals 421 are electrically connected to the semiconductor circuit element wiring pattern 111, respectively, by bonding wires 422. Further, some of the plurality of the terminals 421 are electrically connected to the photoelectric conversion device wiring pattern 110 connected with a terminal 411 of the photoelectric conversion device 41. This results in electrical connection between the photoelectric conversion device 41 and the semiconductor circuit element 42.

Although not shown in FIG. 1, the optical board 1 may be mounted with electronic components, such as a connector, an IC (Integrated Circuit), or active elements (transistors, etc.), passive elements (resistors, capacitors, etc.) in addition to the photoelectric conversion device 41 and the semiconductor circuit element 42.

Figure 2:
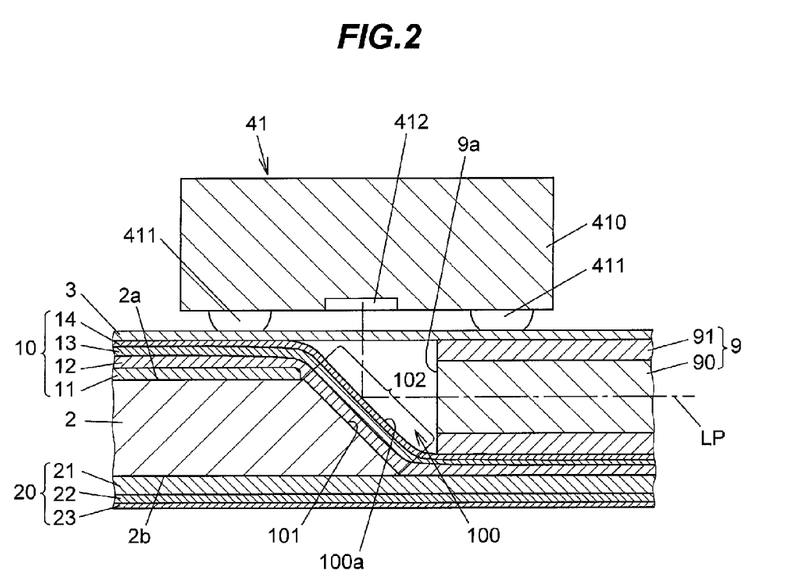
FIG. 2 is a cross sectional view showing one example of the optical module in the first embodiment.

FIG. 2 is a cross sectional view showing one example of the optical module in the first embodiment. The optical module includes the optical board 1 and the photoelectric conversion device 41, and the photoelectric conversion device 41 is mounted on the first main plane 2a to cover a first inclined surface 101 from the side of the main plane 2a.

As shown in FIG. 2, the first metal layer 10 comprises a four-layer configuration including a first underlying metal layer 11, a second underlying metal layer 12, a Ni plating layer 13, and a gold plating layer 14. The total thickness of the first underlying metal layer 11 and the second underlying metal layer 12 is, e.g., 5 to 25 μm, and the thickness of the Ni plating layer 13 is, e.g., not more than 15 μm, and the thickness of the gold plating layer 14 is, e.g., 0.03 to 0.5 μm. A resist 3 is attached so as to cover the surface of the gold plating layer 14.

The inclined surface 101 is formed at the end portion of the optical fiber receiving portion 100 of the substrate 2. On the inclined surface 101, a reflective layer 102 comprising a three-layer structured metal layer composed of a second underlying metal layer 12, a Ni plating layer 13, and a gold plating layer 14 is formed. That is, the reflecting surface 100a comprises the reflective layer 102 provided on the inclined surface 101. The reflective layer 102 and the first metal layer 10 have the common layer configuration, except that the first underlying metal layer 11 is provided as the lowermost layer of the first metal layer 10. In addition, the first metal layer 10 and the reflective layer 102 are plated with gold (gold plating layer 14) as the outermost surface thereof.

On the other hand, the second metal layer 20 is composed of a three-layer structured metal layer including an underlying metal layer 21, a Ni plating layer 22, and a gold plating layer 23. Since the first metal layer 10 and the second underlying metal layer 12 of the reflective layer 102 are provided on the underlying metal layer 21 of the second metal layer 20 in the optical fiber receiving portion 100, the second metal layer 20 and the first metal layer 10 formed continuously to the reflective layer 102 are electrically connected together by the reflective layer 102.

In the present embodiment, one of the photoelectric conversion device wiring patterns 110 that are formed continuously to the reflective layer 102 is a ground pattern 110a (see FIG. 1) that is ground potential, and the potential of the second metal layer 20 is ground potential. Thus, operation of the electronic components mounted on the first main plane 2a side of the substrate 2 is stable, and also by forming a through hole in the substrate 2, a ground (GND) terminal of an IC not shown which is mounted on the first main plane 2a can easily be connected (grounded) to ground potential.

One end portion of the optical fiber 9 is received in the optical fiber receiving portion 100, and an end face 9a thereof faces the reflection surface 100a (the reflective layer 102). The optical fiber 9 has a tubular cladding layer 91 on the outer periphery of the core 90. In FIG. 2, an optical path LP of the light through the optical fiber 9 as the transmission medium is indicated by the dashed line.

When the light is emitted from the optical fiber 9 (core 90), the reflecting surface 100a (reflection layer 102) reflects the emitted light toward the first main plane 2a. When the photoelectric conversion device 41 is a light receiving element, the light reflected by the reflection surface 100a (reflecting layer 102) is received in the photoelectric conversion device 41 through the light emitting or receiving portion 412 provided in the main body portion 410 of the photoelectric conversion device 41, and the photoelectric conversion device 41 converts the received light optical signal into an electrical signal.

Further, when the photoelectric conversion device 41 is a light emitting element, the photoelectric conversion device 41 converts an electrical signal provided from the semiconductor circuit element 42 into an optical signal, and the light indicative of the optical signal is emitted from the light emitting or receiving portion 412. The emitted light is reflected by the reflection surface 100a (reflecting layer 102), and is received in the core 90 of the optical fiber 9, and propagates through the optical fiber 9.

Then, a method of manufacturing the optical board 1 is explained by referring to FIGS. 3A to 3F and 4A to 4E.

FIGS. 3A to 3F are cross sectional views showing a process for forming an optical fiber receiving portion 100 of the optical board 1 and a peripheral portion thereof in the first embodiment. FIGS. 4A to 4E are plan views showing the process for forming the optical fiber receiving portion 100 of the optical board and a peripheral portion thereof in the first embodiment as viewed from the first main plane 2a.

The manufacturing process of the optical board 1 includes: the first step of forming the first underlying metal layer 11 on the first main plane 2a of the substrate 2 and forming the underlying metal layer 21 on the second main plane 2b; the second step of partially removing a portion of the first underlying metal layer 11 to expose a strip-shaped portion 11a; the third step of irradiating laser light L obliquely to the first main plane 2a to the exposed strip-shaped portion 11a, to form the optical fiber receiving portion 100, and the inclined surface 101 at the end portion of the optical fiber receiving portion 100; the fourth step of forming the second underlying metal layer 12 on the inclined surface 101 and the first underlying metal layer 11 of the first main plane 2a; the fifth step of partially etching the first underlying metal layer 11 and the second underlying metal layer 12 to form a plurality of the photoelectric conversion device wiring patterns 110 and the semiconductor circuit element wiring patterns 111 on the first main plane 2a; the sixth step of applying platings of nickel (Ni) and gold (Au) to the first underlying metal layer 11 and the second underlying metal layer 12, and the underlying metal layer 21 on the second main plane 2b side; and the seventh step of pasting the resist 3 to the first main plane 2a entirely. Hereinafter, the first to the seventh steps will be explained in more detail.

Figure 3A:
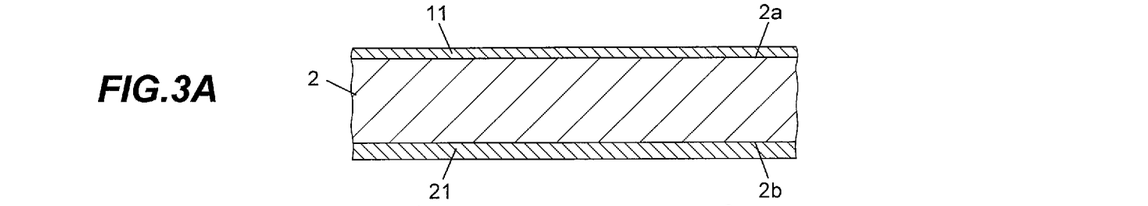
FIGS. 3A to 3F are cross sectional views showing a process for forming an optical fiber receiving portion of the optical board and a peripheral portion thereof in the first embodiment.
Figure 4A:
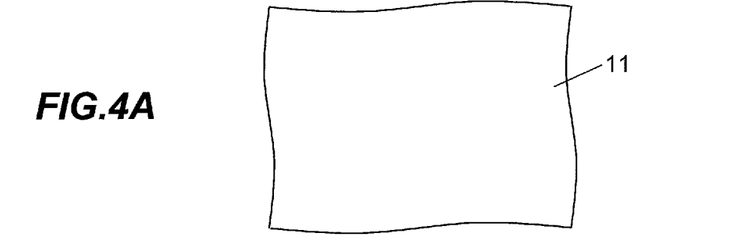
FIGS. 4A to 4E are plan views showing the process for forming the optical fiber receiving portion of the optical board and the peripheral portion thereof in the first embodiment as viewed from a side of a first main plane.

In the first step, as shown in FIGS. 3A and 4A, the first underlying metal layer 11 and the underlying metal layer 21 are formed entirely over the first main plane 2a and the entire second main plane 2b, respectively, of the substrate 2, by, e.g., bonding, metallization, or electroless plating. In the present embodiment, each of the first underlying metal layer 11 and the underlying metal layer 21 is consisted essentially of copper (Cu) which is a good conductor.

Figure 3B:
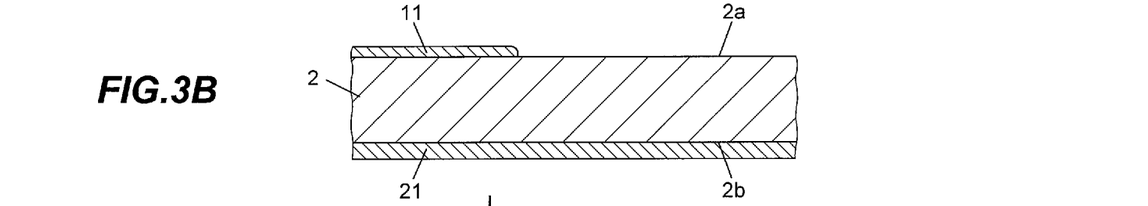
Figure 4B:
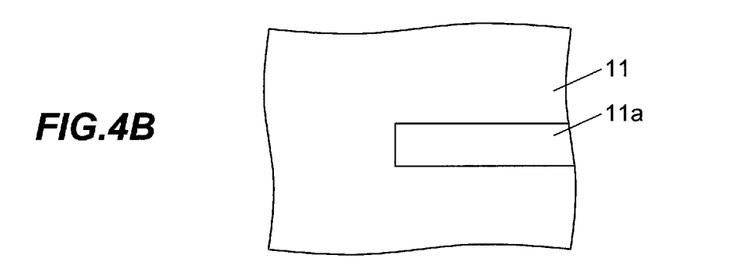

In the second step, as shown in FIG. 3B and FIG. 4B, the portion of the first underlying metal layer 11 is partially removed in a strip shape by etching to expose a strip-shaped portion 11a. More specifically, a resist film is provided on the first underlying metal layer 11 except for the strip shaped portion 11a in which the first underlying metal layer 11 is to be removed, and a portion of the first underlying metal layer 11 with no resist film is dissolved by etching.

Figure 3C:
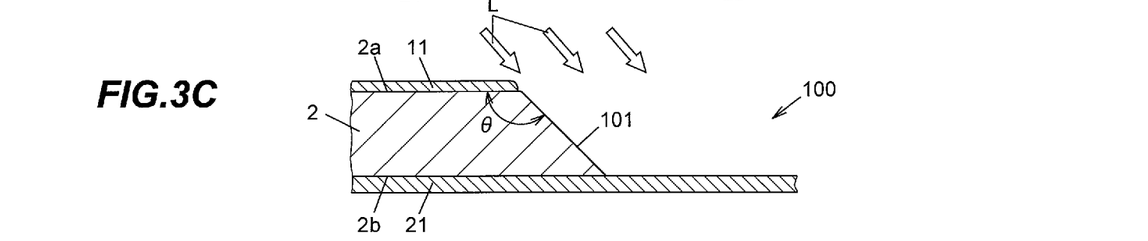
Figure 4C:
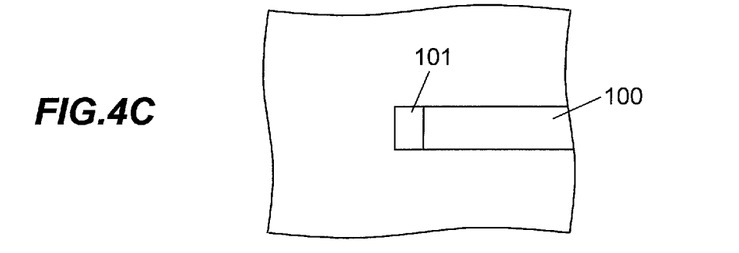

In the third step, as shown in FIG. 3C, the laser light L is irradiated obliquely to the first main plane 2a including the exposed strip-shaped portion 11a. As the laser light, more specifically, e.g., an excimer laser or UV laser (ultraviolet laser) may be used. By the irradiation of the laser light L, as shown in FIGS. 3C and 4C, the optical fiber receiving portion 100 and the inclined surface 101 at the end portion of the optical fiber receiving portion 100 are formed on the substrate 2. The intensity of the laser light L is the intensity capable of cutting the substrate by irradiation with light, a first underlying metal layer 11, and is the intensity at which the first underlying metal layer 11 and the underlying metal layer 21 are not cut by irradiation. Accordingly, the optical fiber receiving portion 100 is provided only in the portion from which the first underlying metal layer 11 is removed.

The inclined surface 101 is formed along the traveling direction of the laser light L. In other words, when an angle of the inclined surface 101 to the first main plane 2a is a tilt angle θ, the inclined surface 101 having a desired shape can be formed by irradiating the laser light L to the first main plane 2a at an angle corresponding to the tilt angle θ. The tilt angle θ is an obtuse angle (θ>90 degrees), and the tilt angle θ is 135 degrees in the present embodiment. That is, the angle made by the second main plane 2b and the inclined surface 101 is 45 degrees.

Further, the underlying metal layer 21 on the second main plane 2b is not removed by the irradiation of the laser light L, and serves as a bottom surface of the optical fiber receiving portion 100. The underlying metal layer 21 supports the optical fiber 9 from the side of the second main plane 2b (shown in FIG. 1).

Figure 3D:
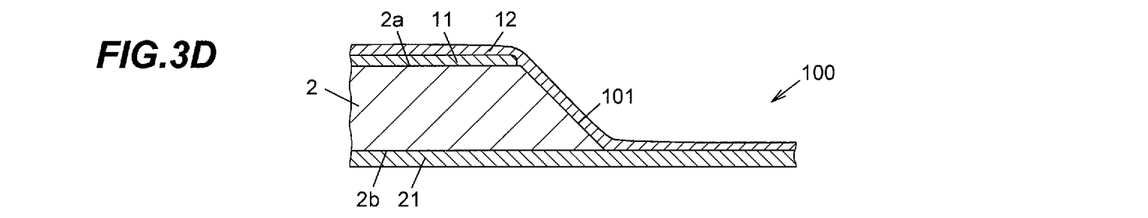

In the fourth step, as shown in FIG. 3D, the second underlying metal layer 12 is formed entirely on the inclined surface 101 formed on the substrate 2 and on the first underlying metal layer 11 formed on the first main plane 2a in the third step. In the present embodiment, the second underlying metal layer 12 is consisted essentially of copper (Cu), and is provided on the first underlying metal layer 11, and the inclined surface 101 by e.g., electroless plating. Further, the second underlying metal layer 12 is also formed on one surface (a surface on the side of the second main plane 26) of the underlying metal layer 21 in the optical fiber receiving portion 100.

Figure 4D:
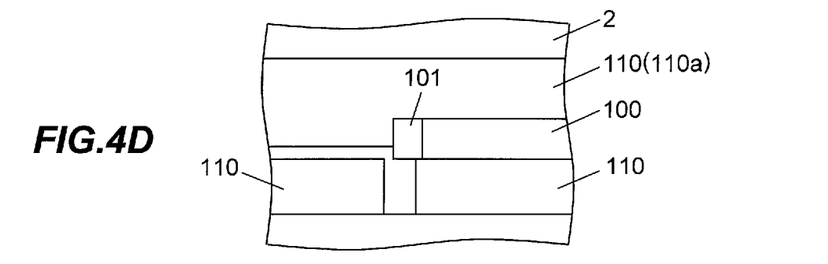

In the fifth step, as shown in FIG. 4D, the first underlying metal layer 11 and the second underlying metal layer 12 are partially etched to form a plurality of the photoelectric conversion device wiring patterns 110 and the semiconductor circuit element wiring patterns 111 on the first main plane 2a. More specifically, the resist film is provided on the second underlying metal layer 12 except for the regions from which the first underlying metal layer 11 and the second underlying metal layer 12 are removed, and the first underlying metal layer 11 and the second underlying metal layer 12 at the regions with no resist film are dissolved by etching. The resist film is also formed on the second underlying metal layer 12 which is formed on the inclined surface 101, and the second underlying metal layer 12 on the second inclined surface 101 is left without being removed.

Figure 3E:
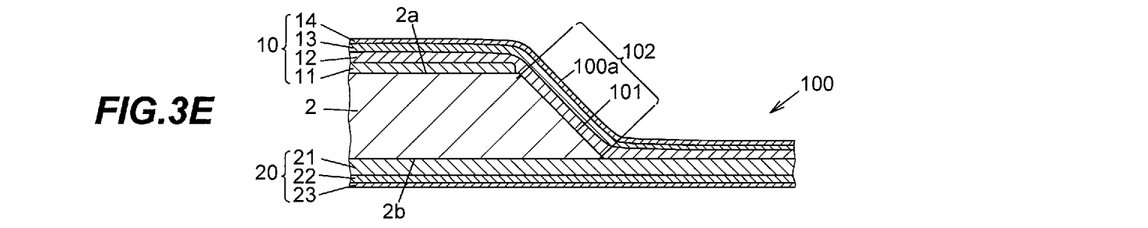

In the sixth step, as shown in FIG. 3E, nickel (Ni) plating is applied on the second underlying metal layer 12 remaining without being removed by etching in the fifth step and the underlying metal layer 21 on the second main plane 2b, to form Ni plating layers 13 and 22. Thereafter, gold (Au) plating is further applied to the Ni plating layers 13 and 22, to form gold plating layers 14 and 23. The nickel plating and the gold plating can be performed by, e.g., electroless plating.

Figure 3F:
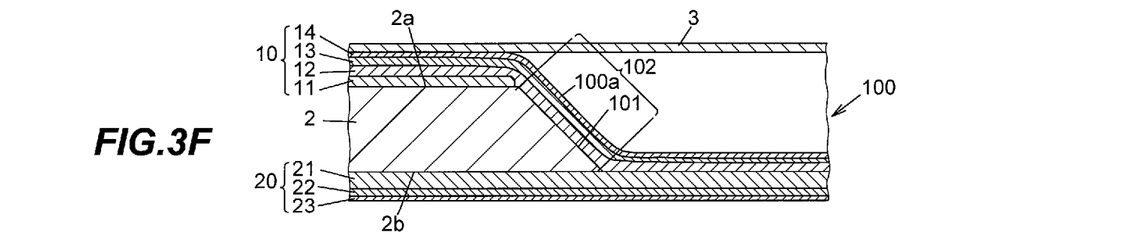
Figure 4E:
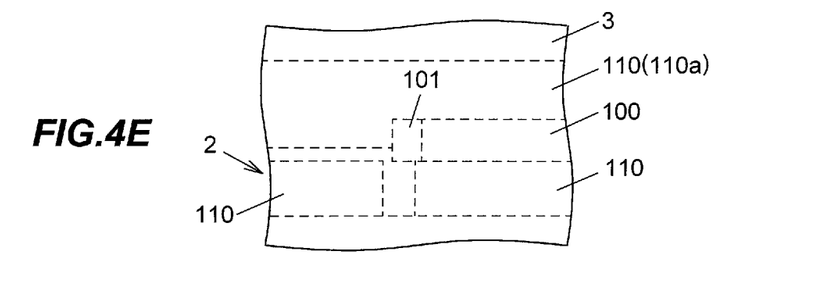

In the seventh step, as shown in FIGS. 3F and 4E, the film-like resist (resist film) 3 is arranged to entirely cover the first main plane 2a. In other words, the surface of the optical fiber receiving portion 100 on the side of the first main plane 2a and the surface of the first metal layer 10 (the photoelectric conversion device wiring pattern 110, the semiconductor circuit element wiring pattern 111) are covered with the resist 3. Accordingly, the optical fiber receiving portion 100 comprises a cavity structure in which the surface on the side of the first main plane 2a side is covered with the resist 3, while the surface on the side of the second main plane 2b is covered with the second metal layer 20.

Effects of the First Embodiment

The embodiment described above has effects described below.

(1) Because the optical fiber receiving portion 100 is configured to penetrate the substrate 2 in the thickness direction, the thickness of the substrate 2 may be equivalent to the diameter of the optical fiber 9. Further, it is not necessary to provide an optical fiber-fixing member (flat glass) as in the optical mounting substrate disclosed by e.g. JP-A-2003-167175. Thus, it is possible to reduce the thickness of the optical board 1.

(2) Since there is no need to separately provide a member for preventing the slipping of the optical fiber 9 out from the optical fiber receiving portion 100 in the present embodiment, it is possible to reduce the manufacturing cost.

(3) Because the optical fiber receiving portion 100 has the cavity structure, it is possible to insert or remove the optical fiber 9 in the direction parallel to the optical board 1. Therefore, it is possible to insert or remove the optical fiber 9 without detaching the other electronic parts mounted on the optical board 1, and thereby facilitate the work.

(4) Since the optical fiber receiving portion 100 and the inclined surface 101 are formed by the irradiation of the laser light L, it is possible to configure the reflecting surface 100a without providing a separate member such as separate reflecting member, or using a mold as in the optical mounting substrate disclosed by JP-A-2003-167175.

Second Embodiment

Next, a second embodiment of the present invention will be described with reference to FIGS. 5 to 9. For the optical board 1 of the present embodiment, the second step and subsequent steps of the manufacturing process are different from the second step and subsequent steps of the manufacturing process for the optical board 1 in the first embodiment. In FIGS. 5 to 9, elements having the same functions as those described for the optical board 1 are assigned with common reference numerals or characters, and duplicated descriptions thereof are omitted.

Further, in this embodiment, a first metal layer 10A is formed in place of the first metal layer 10 in the first embodiment, a second metal layer 20A is formed in place of the second metal layer 20 in the first embodiment, an optical fiber receiving portion 100A is formed in place of the optical fiber receiving portion 100 in the first embodiment, and a reflecting surface 90a is formed in place of the reflecting surface 100a in the first embodiment. The respective metal layers, plating layer materials, layer configurations and the like of the first metal layer 10A and the second metal layer 20A are common.

Figure 5:
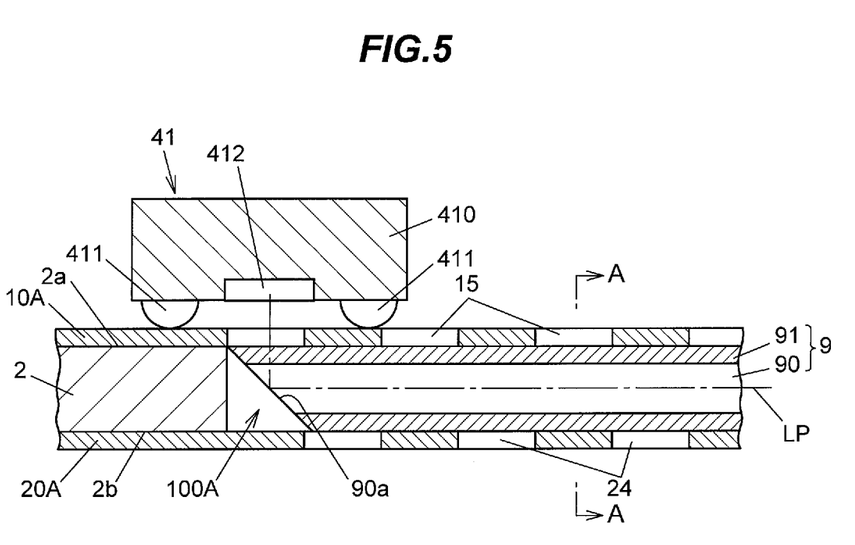
FIG. 5 is a cross sectional view showing an example of an optical module in the second embodiment.
Figure 6:
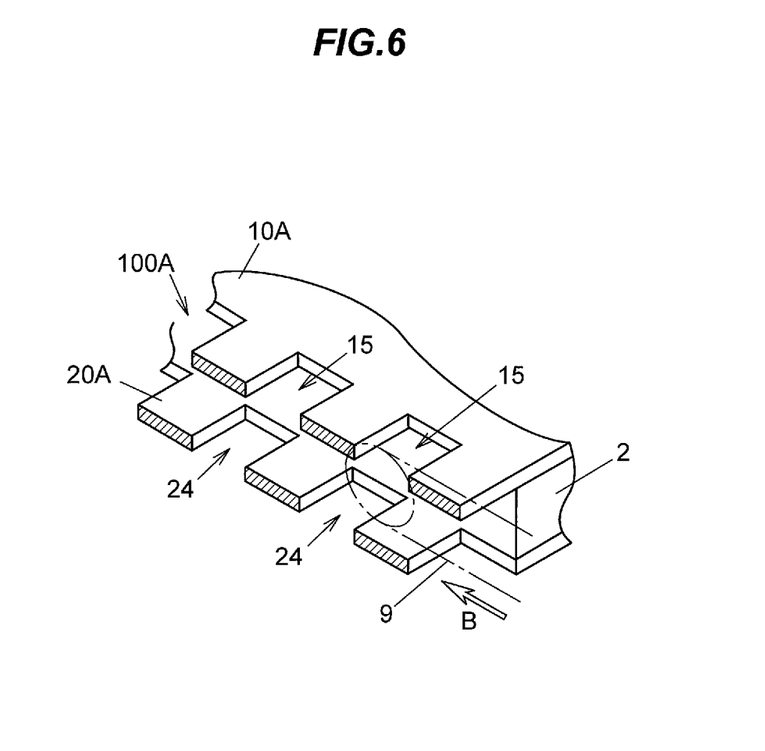
FIG. 6 is a perspective view showing an example of the optical module in the second embodiment.

FIG. 5 is a cross sectional view showing one example of an optical module in the second embodiment. FIG. 6 is a perspective view showing one example of the optical module in the second embodiment.

In the optical fiber receiving portion 100A according to this embodiment, a plurality of apertures 15 are formed at the first main plane 2a and a plurality of apertures 24 are formed at the second main plane 2b. The plurality of apertures 15 and the plurality of apertures 24 are arranged alternately along the longitudinal direction of the optical fiber receiving portion 100A. In other words, the optical fiber receiving portion 100A is covered by the plurality of apertures 15 through which the receiving space of the optical fiber receiving portion 100A faces outward, namely, the plurality of apertures 15 communicate the receiving space of the optical fiber receiving portion 100A, on the side of the first main plane 2a, and the plurality of apertures 24 through which the receiving space of the optical fiber receiving portion 100A faces outward on the side of the second main plane 2b.

Further, no inclined surface is formed in the substrate 2 at the end portion of the optical fiber receiving portion 100A. Instead, the end face 9a of the optical fiber 9 is tilted with respect to the first main plane 2a, to form the reflecting surface 90a. In the present embodiment, the tilt angle is 45 degrees.

The reflective surface 90a reflects the light emitted from the core 90 toward the first main plane 2a, and passes the light into the photoelectric conversion device 41. Also, the light emitted from the photoelectric conversion device 41 is reflected by the reflecting surface 90a and to be input to the core 90.

FIGS. 7A to 7D are cross sectional views showing a process for forming the optical fiber receiving portion 100A of the optical board 1 and a peripheral portion thereof in the second embodiment. FIGS. 8A to 8D are cross sectional views showing the process for forming the optical fiber receiving portion 100A and a peripheral portion thereof when the optical board 1 in the second embodiment as viewed from the first main plane 2a.

Figure 7A:
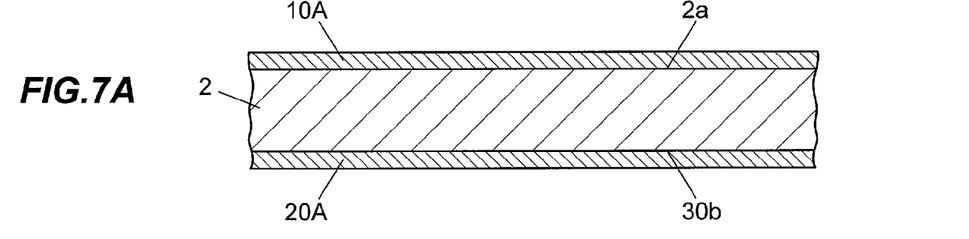
FIGS. 7A to 7D are cross sectional views showing a process for forming an optical fiber receiving portion of the optical board and a peripheral portion thereof in the second embodiment.
Figure 8A:
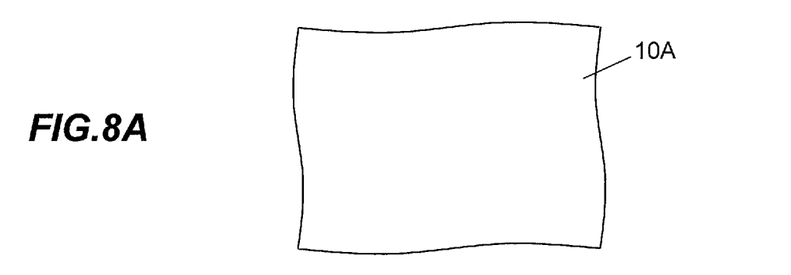
FIGS. 8A to 8D are cross sectional views showing a formation process for an optical fiber receiving portion of the optical board and a peripheral portion thereof in the second embodiment as viewed from a side of a first main plane.

In the first step in the present embodiment, as shown in FIGS. 7A and 8A, the first metal layer 10A and the second metal layer 20A are formed entirely over the first main plane 2a and the second main plane 2b respectively of the substrate 2 by, e.g., bonding, metallization, or electroless plating. Unlike the configuration of the first metal layer 10 in the first embodiment, the first metal layer 10A in the present embodiment is consisted essentially of a three-layer structured metal layer having an underlying metal layer, a Ni plating layer, and a gold plating layer. The layer configuration of the second metal layer 20A and is a layer configuration similar to the first metal layer 10A.

Figure 7B:
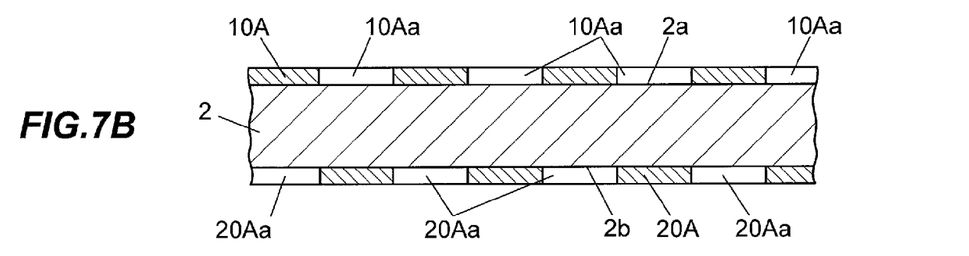
Figure 8B:
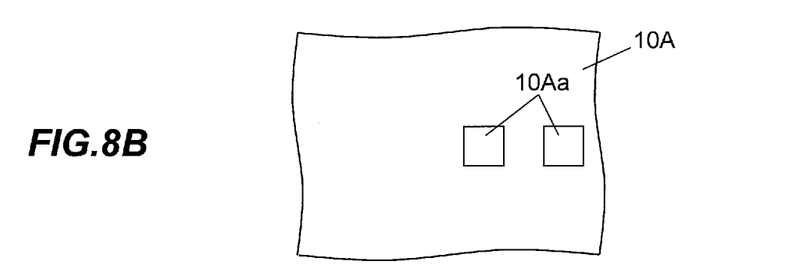

In the second step, as shown in FIGS. 7B and 8B, a plurality of portions (regions to be formed as the apertures 15 and 24) of the first metal layer 10A and the second metal layer 20A are removed in a square shape by etching. In other words, the first main plane 2a is exposed in the plurality of square-shaped removed portions 10Aa of the first metal layer 10A, while the second main plane 2b is exposed in the plurality of square-shaped removed portions 20Aa of the second metal layer 20A. The plurality of removed portions 10Aa and 20Aa are arranged alternately at a predetermined pitch along the longitudinal direction of the optical fiber receiving portion 100A. The predetermined pitch may be a distance of not less than the thickness direction dimension of the substrate 2.

Figure 7C:
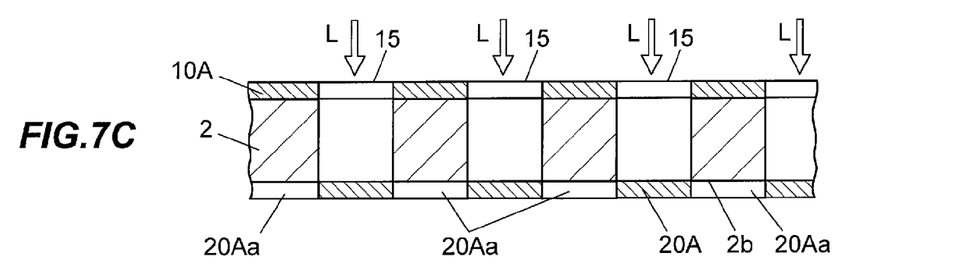
Figure 8C:
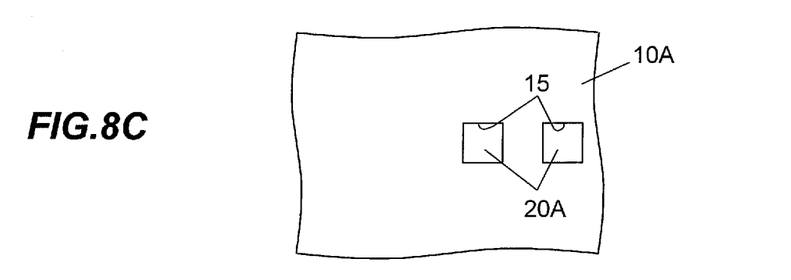

In the third step, as shown in FIGS. 7C and 8C, the plurality of removed portions 10Aa of the first metal layer 10A are irradiated with the laser light L perpendicular to the first main plane 2a. According to this process, the plurality of apertures 15 are formed as well as the substrate 2 are cut by irradiation such that the second metal layer 20A is partially exposed.

Figure 7D:
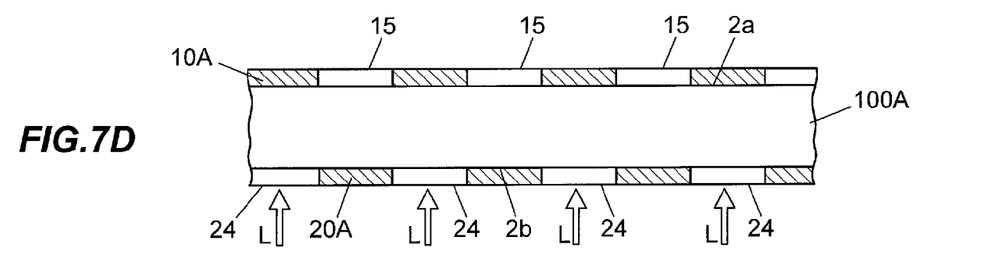
Figure 8D:
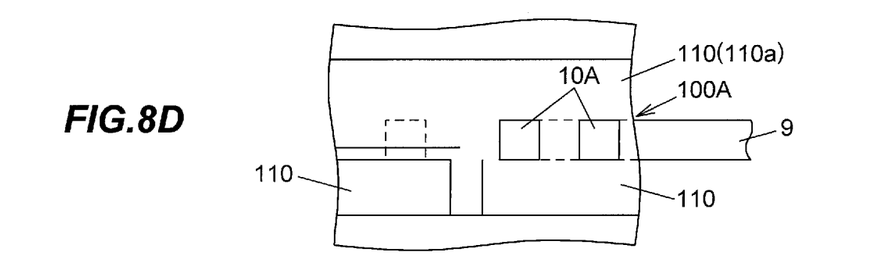

In the fourth step, as shown in FIGS. 7D and 8D, in the same manner as the third step, the plurality of the removed portions 20Aa of the second metal layer 20A are irradiated with the laser light L perpendicular to the second main plane 2b. According to this process, the plurality of apertures 24 are formed as well as the substrate 2 are cut by irradiation such that the optical fiber receiving portion 100A is formed. In other words, in the third step and the fourth step, the optical fiber receiving portion 100A is formed in the substrate 2 by the laser light L passed through the removed portions 10Aa (the apertures 15) of the first metal layer 10A and the removed portions 20Aa (the apertures 24) of the second metal layer 20A.

Figure 9A:
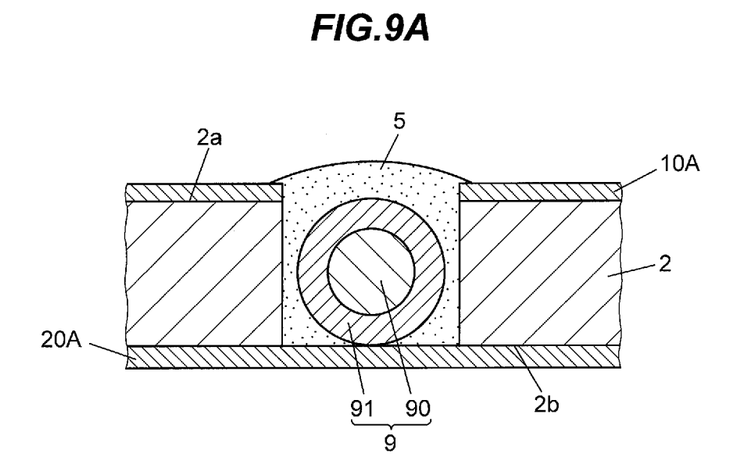
Figure 9B:
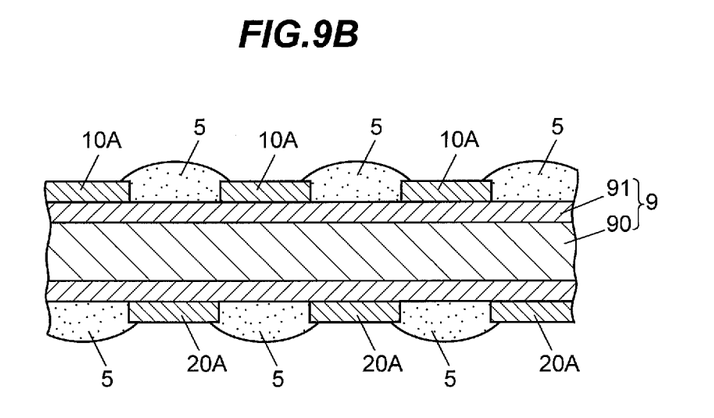

Incidentally, in the above embodiment, the optical fiber 9 may be fixed to the optical fiber receiving portion 100A with solder 5. FIGS. 9A and 9B show one example of the optical fiber 9 is fixed with 5 solder in the second embodiment, wherein FIG. 9A is a cross sectional view taken along A-A line of FIG. 5 and FIG. 9B is a partially enlarged view of FIG. 5.

The optical fiber 9 is inserted from a direction (arrow B in FIG. 6) parallel to the optical board 1 along the longitudinal direction of the optical fiber receiving portion 100A. As shown in FIG. 9, the optical fiber 9 received in the optical fiber receiving portion 100A is fixed in the optical fiber receiving portion 100A with the solder 5. More specifically, the optical fiber 9 is firmly fixed to the outermost surface (specifically, the gold plating layer) of the first metal layer 10A and the second metal layer 20A to plug the plurality of apertures 15 and 24.

Effects of the Second Embodiment

The second embodiment described above has the following effects, in addition to the effects (1) to (3) of the first embodiment.

According to the present embodiment, it is possible to form the fiber receiving portion 100A by irradiating the laser light L, cover the surface on the side of the first main plane 2a with the first metal layer 10A having the plurality of apertures 15, and cover the surface on the side of the second main plane 2b with the second metal layer 20A having the plurality of apertures 24. Therefore, in the third and the fourth step of irradiating the laser light L, the cavity structure of the optical fiber receiving portion 100A is formed. This therefore leads to shortening of the working process.

Also in this embodiment, it is possible to prevent the axial movement and rotation of the optical fiber 9 in the optical fiber receiving portion 100A by fixing the optical fiber 9 in the optical fiber receiving portion 100A with solder 5. Thus, it is possible to properly maintain the position and angle of the reflecting surface 90a.

Modification of the Second Embodiment

Further, the optical board 1 of the second embodiment may also be implemented by modifying, for example, as follows.

Figure 10:
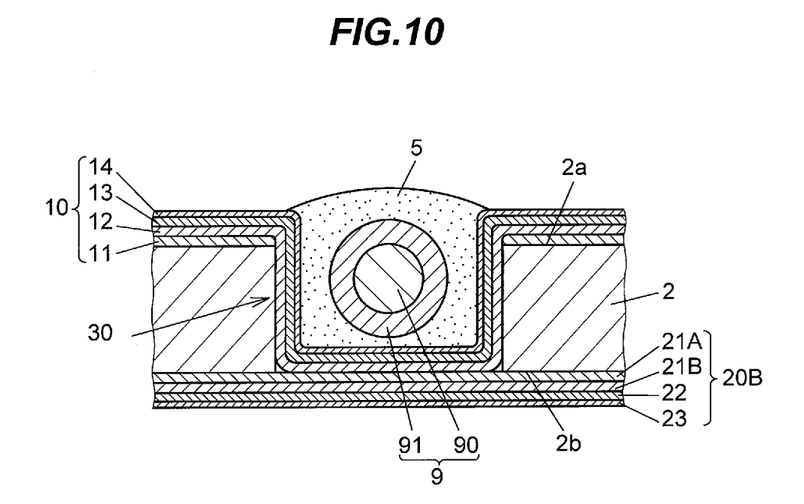
FIG. 10 is a cross sectional view showing a cross section perpendicular to a longitudinal direction of an optical fiber receiving portion located at an aperture, in one example of an optical module in a modification to the second embodiment.

FIG. 10 is a cross sectional view showing a cross section perpendicular to a longitudinal direction of the optical fiber receiving portion 100A located at the apertures 15 (see FIG. 5), in one example of an optical module in a modification to the second embodiment. Unlike the structure of the optical fiber receiving portion 100A in the second embodiment, the surface of the substrate 2 in the optical fiber receiving portion 100A in this modification is formed with a third metal layer 30.

In this modification, similarly to the first embodiment, the first metal layer 10 provided on the first main plane 2a is consisted essentially of a four-layer structured metal layer including a first underlying metal layer 11, a second underlying metal layer 12, a Ni plating layer 13, and a gold plating layer 14. Similarly to the first metal layer 10, the layer configuration of the second metal layer 20B provided on the second main plane 2b is consisted essentially of a four-layer structured metal layer including a first underlying metal layer 21A, a second underlying metal layer 21B, a Ni plating layer 22, and a gold plating layer 23. As shown in FIG. 10, the third metal layer 30 is consisted essentially of a three-layer structured metal layer including a second underlying metal layer 12, a Ni plating layer 13, and a gold plating layer 14. Further, at a cross section lying at the apertures 24 (see FIG. 5), the third metal layer 30 is consisted essentially of a three-layer structured metal layer including a second underlying metal layer 21B, a Ni plating layer 22, and a gold plating layer 23.

In the first step in this modification, only the first underlying metal layer 11 of the first metal layer 10, and the first underlying metal layer 21A of the second metal layer 20B are each formed by, e.g., bonding, metallization, or electroless plating. In the second step, a plurality of portions of each of the first underlying metal layers 11 and 21A are removed in a square shape by etching. In the third step and the fourth step, in the same manner as the third step and the fourth step in the second embodiment, the optical fiber receiving portion 100A is formed by irradiating the laser light L to the plurality of the removed portions.

In this modification, in the fifth step following the fourth step, a second underlying metal layer 12, a Ni plating layer 13, and a gold plating layer 14 are each provided on a first main plane 10a and the surface of the substrate 2 in the optical fiber receiving portion 100A by, e.g., bonding, metallization, or electroless plating, while a second underlying metal layer 21B, a Ni plating layer 22, and a gold plating layer 23 are each provided on the second main plane 10b and the surface of the substrate 2 in the optical fiber receiving portion 100A by, e.g., bonding, metallization, or electroless plating. Thus, the third metal layer 30 is formed on the surface of the substrate 2 in the optical fiber receiving portion 100A.

Further, according to this modification, in the sixth step, the optical fiber 9 inserted in the optical fiber receiving portion 100A is fixed in the optical fiber receiving portion 100A with the solder 5.

With the optical module in this modification, because the third metal layer 30 is provided on the surface of the substrate 2 in the optical fiber receiving portion 100A, when the optical fiber 9 is inserted into the optical fiber receiving portion 100A, the friction between the outermost surface (the gold plating layers 14, 24) of the third metal layer 30 and the optical fiber 9 is reduced, thereby facilitating the insertion.

Further, when the optical fiber 9 is inserted into the optical fiber receiving portion 100A, the solder 5 is also firmly fixed to the outermost surface (the gold plating layers 14, 24) of the third metal layer 30, thereby allowing the optical fiber 9 to be more securely fixed in the optical fiber receiving portion 100A.

Summary of the Embodiment

Next, the technical idea that is ascertained from the embodiments described above will be described with the aid of the numerals, characters and the like in the embodiments. However, it should be noted that each numeral, character and the like in the following description is not limited to the members and the like specifically shown in the embodiments as the elements in the claims.

[1] An optical board (1), comprising: a substrate (2) comprising a plate-shaped resin including a first main plane (2a) and a second main plane (2b), and an optical fiber receiving portion (100, 100A) to receive an optical fiber (9); a first metal layer (10, 10A) provided on the first main plane (2a); and a second metal layer (20, 20A) provided on the second main plane (2b), in which the optical fiber receiving portion (100, 100A) comprises a cavity structure, which penetrates in a thickness direction of the substrate (2) between the first main plane (2a) and the second main plane (2b), and in which the optical fiber (9) is prevented from slipping out of the first main plane (2a) and the second main plane (2b).

[2] The optical board (1) according to [1], in which the optical fiber receiving portion (100, 100A) is at least partially covered with the second metal layer (20, 20A) on a side of the second main plane (2b).

[3] The optical board (1) according to [1] or [2], in which the optical fiber receiving portion (100) is covered with an insulating film (3) which covers the first metal layer (10) on a side of the first main plane (2a).

[4] The optical board (1) according to [1] or [2], in which the optical fiber receiving portion (100A) is covered with the first metal layer (10A) on a side of the first main plane (2a), and the first metal layer (10A) comprises a plurality of apertures (15) communicating a receiving space of the optical fiber receiving portion (100A).

[5] The optical board (1) according to [4], in which the optical fiber receiving portion (100A) is covered with the second metal layer (20A) on a side of the second main plane (2b), and the second metal layer (20A) comprises a plurality of apertures (24) communicating a receiving space of the optical fiber receiving portion (100A).

[6] The optical board (1) according to [4] or [5], further comprising a third metal layer (30) provided on a surface of the substrate (2) in the optical fiber receiving portion (100A).

[7] The optical board (1) according to any one of [4] to [6], in which the optical fiber (9) is fixed to the optical fiber receiving portion (100A) by a solder (5).

[8] The optical board (1) according to any one of [1] to [7], further comprising a reflecting surface (100a) provided in the substrate (2) at an end of the optical fiber receiving portion (100, 100A) to reflect light propagating through the optical fiber (9), the reflecting surface (100a) being inclined relative to the first main plane (2a).

[9] A method for manufacturing the optical board (1) according to [5], comprising irradiating laser light (L) from the side of the first metal layer (10A) and the side of the second metal layer (20A) to pass the laser light (L) through the apertures (15, 24) in the first metal layer (10A) and the second metal layer (20A) and thereby form the optical fiber receiving portion (100A) in the substrate (2).

[10] An optical module, comprising: the optical board (1) according to any one of [1] to [8], and a photoelectric conversion device (41) for converting an optical signal through the optical fiber (9) as a transmission medium to an electrical signal or for converting an electrical signal to an optical signal through the optical fiber (9) as the transmission medium.

Although the embodiment of the present invention has been described above, the embodiment described above is not intended to limit the invention in the appended claims. It should also be noted that not all the combinations of the features described in the above embodiment are essential to the means for solving the problems of the invention.

The present invention may be carried out by appropriate modification without departing from its gist. For example, although so-called solid pattern, in which the second metal layer 20 is provided entirely over the second main plane 2b, has been described in the above embodiments, a portion of the second metal layer 20 may be etched into a desired shape and used as a wiring pattern. In this case, it is possible to mount an electronic component on the second main plane 2b as well.

Also, although the case where the optical board 1 is formed with one optical fiber receiving portion 100 and the optical module has been described in the above embodiments, the present invention is not limited thereto, but the optical board 1 may be formed with a plurality of optical fiber receiving portions 100 and optical module structures.

Also, although the case where each of the first underlying metal layers 11, 21A, the second underlying metal layers 12, 21B, and the underlying metal layer 21 is made of copper (Cu) has been described in the above embodiments, the present invention is not limited thereto, but part or all of the first underlying metal layers 11, 21A, the second underlying metal layers 12, 21B, and the underlying metal layer 21 may be made of e.g. aluminum (Al). The materials in each layer of the first metal layers 10, 10A, the second metal layers 20, 20A and 20B are also not limited to the above. The material of the substrate 2 is also not limited to polyimide, but may be for example a PET (polyethylene terephthalate).

Further, the inclined surface 101 and the optical fiber receiving portions 100, 100A may be formed by using a shadow mask with adjusted laser light transmittance.

Further, the inclined surface 101 may be formed by machining such as dicing. The machining allows formation of the inclined surface 101 at a lower cost than the laser light processing.

Also, in the first embodiment, the reflecting surface 100a may be not provided on the inclined surface 101 formed in the substrate 2, but a separate reflecting member or the like may be provided thereon. Alternatively, the reflecting surface 100a may be formed by tilting the end face 9a of the optical fiber 9. Similarly, in the second embodiment, the reflective surface 90a may be provided as a separate reflecting member or the like. Alternatively, the reflective surface 90a may be provided on an inclined surface which is formed directly in the substrate 2 with laser light L.

Further, although the plurality of apertures 15 and 24 are provided on the side of the first main plane 2a and the side of the second main plane 2b respectively in the second embodiment and in the modification thereto, the present invention is not limited thereto, but only the plurality of apertures 15 may be provided on the side of the first main plane 2a, or only the plurality of apertures 24 may be provided on the side of the second main plane 2b. In this case, the optical fiber receiving portion 100A is formed by not only irradiating laser light L perpendicularly from the removed portions 10Aa or the removed portions 20Aa, but also irradiating laser light L obliquely therefrom.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical board, comprising:
    a substrate comprising a plate-shaped resin including a first main plane and a second main plane, and an optical fiber receiving portion to receive an optical fiber;
    a first metal layer provided on the first main plane; and
    a second metal layer provided on the second main plane,
    wherein the optical fiber receiving portion comprises a cavity structure, which penetrates the substrate in a thickness direction of the substrate between the first main plane and the second main plane, and
    wherein the optical fiber is prevented from slipping out of the first main plane and the second main plane.

2. The optical board according to claim 1, wherein the optical fiber receiving portion is at least partially covered with the second metal layer on a side of the second main plane.

3. The optical board according to claim 1, wherein the optical fiber receiving portion is covered with an insulating film which covers the first metal layer on a side of the first main plane.

4. An optical board, comprising:
    a substrate comprising a plate-shaped resin including a first main plane and a second main plane, and an optical fiber receiving portion to receive an optical fiber;
    a first metal layer provided on the first main plane; and
    a second metal layer provided on the second main plane,
    wherein the optical fiber receiving portion comprises a cavity structure, which penetrates in a thickness direction of the substrate between the first main plane and the second main plane,
    wherein the optical fiber is prevented from slipping out of the first main plane and the second main plane, and
    wherein the optical fiber receiving portion is covered with the first metal layer on a side of the first main plane, and the first metal layer comprises a plurality of apertures communicating a receiving space of the optical fiber receiving portion.

5. The optical board according to claim 4, wherein the optical fiber receiving portion is covered with the second metal layer on a side of the second main plane, and the second metal layer comprises a plurality of apertures communicating a receiving space of the optical fiber receiving portion.

6. The optical board according to claim 4, further comprising:
    a third metal layer provided on a surface of the substrate in the optical fiber receiving portion.

7. The optical board according to claim 4, wherein the optical fiber is fixed to the optical fiber receiving portion by a solder.

8. The optical board according to claim 1, further comprising:
    a reflecting surface provided in the substrate at an end of the optical fiber receiving portion to reflect light propagating through the optical fiber, the reflecting surface being inclined relative to the first main plane.

9. An optical module, comprising:
    the optical board according to claim 1; and
    a photoelectric conversion device for converting an optical signal through the optical fiber as a transmission medium to an electrical signal or for converting an electrical signal to an optical signal through the optical fiber as the transmission medium.

10. The optical board according to claim 1, wherein the first metal layer comprises a plurality of apertures communicating a receiving space of the optical fiber receiving portion.

11. The optical board according to claim 1, wherein the first metal layer comprises at least one aperture communicating a receiving space of the optical fiber receiving portion.

12. The optical board according to claim 1, further comprising:
    a third metal layer provided on a surface of the substrate in the optical fiber receiving portion.

13. The optical board according to claim 1, wherein the optical fiber receiving portion extends parallel to the first main plane and the second main plane.

14. The optical board according to claim 1, further comprising:
    a reflecting surface disposed at one end portion of the optical fiber receiving portion, the reflecting surface reflecting light through the optical fiber.

15. The optical board according to claim 14, wherein another end portion of the optical fiber receiving portion is opened toward an end face of the substrate to define an aperture in which the optical fiber is inserted from into the optical fiber receiving portion.

16. The optical board according to claim 15, wherein the end face of the substrate includes a side surface at an end portion of the substrate between the first main plane and the second main plane.

17. The optical board according to claim 14, wherein an end face of the optical fiber faces the reflecting surface.

18. The optical board according to claim 1, wherein the first metal layer includes:
    a photoelectric conversion device wiring pattern configured to be electrically connected to a photoelectric conversion device; and
    a semiconductor circuit element wiring pattern configured to be electrically connected to a semiconductor circuit element.

19. The optical board according to claim 18, wherein, on the first main plane of the optical board, the photoelectric conversion device is mounted on the photoelectric conversion device wiring pattern, and the semiconductor circuit element is mounted on the semiconductor circuit element wiring pattern.

* * * * *